Aug. 23, 1955     L. T. ASKREN ET AL     2,716,005
REEL DRIVING MECHANISM FOR MOTION-PICTURE PROJECTORS
Filed April 30, 1953     2 Sheets-Sheet 1

Lee T. Askren
Henry N. Fairbanks
INVENTORS

BY
ATTORNEYS

Aug. 23, 1955

L. T. ASKREN ET AL 2,716,005

REEL DRIVING MECHANISM FOR MOTION-PICTURE PROJECTORS

Filed April 30, 1953

2 Sheets-Sheet 2

Lee T. Askren
Henry N. Fairbanks
INVENTORS

BY

ATTORNEYS

United States Patent Office 2,716,005
Patented Aug. 23, 1955

2,716,005

REEL DRIVING MECHANISM FOR MOTION-PICTURE PROJECTORS

Lee T. Askren and Henry N. Fairbanks, Rochester, N. Y., assignors to Eastman Kodak Company, Rochester, N. Y., a corporation of New Jersey Application April 30, 1953, Serial No. 352,224

8 Claims. (Cl. 242—55)

The present invention relates to motion-picture projectors, and particularly to the driving mechanism for the supply spindle thereof.

When a motion-picture projector is required to operate in reverse with 50-foot reels having a core diameter of 1¼ inches and 2000-foot reels having an outside diameter of 15 inches, the limits of reverse take-up torque applied to the supply spindle are rather narrow. Rewinding, however, requires a torque much higher than could be used for reverse take-up.

The primary object of the present invention is to provide a drive mechanism for the supply spindle of a projector which meets these conditions of different degrees of driving torque during reverse projection and rewind.

Another object is to provide a driving mechanism for the supply spindle of a reversible projector which includes an epicyclic or planetary system and a brake for the system which is adjustable.

A further object is to provide a driving mechanism for the supply spindle of a projector in which the brake is a one-way brake and is adjustable so that when the drive is set for reverse projection the supply spindle is driven through the epicyclic system at reduced speed and with a torque which is suitable for the size of film reels being used.

Figure 1:
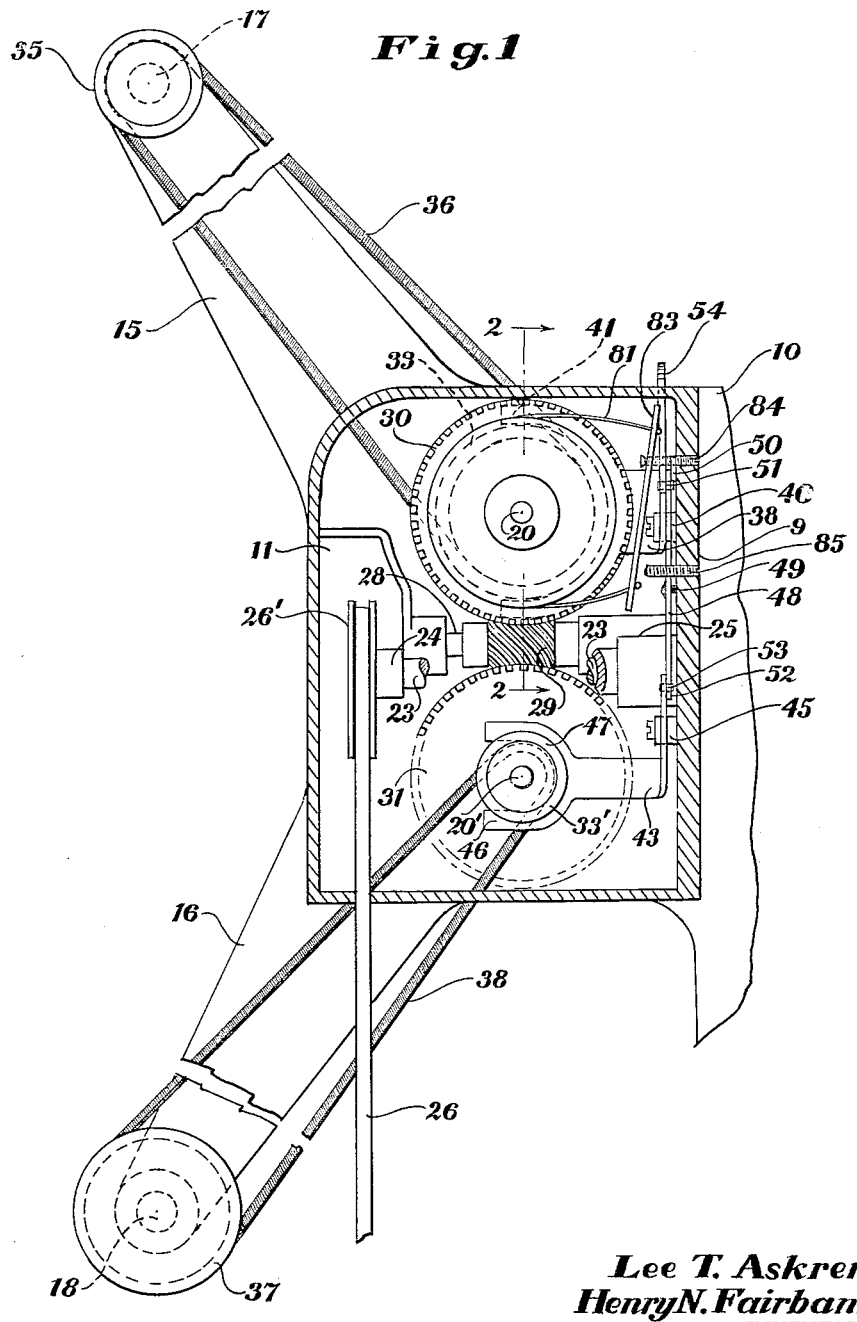
Figure 2:
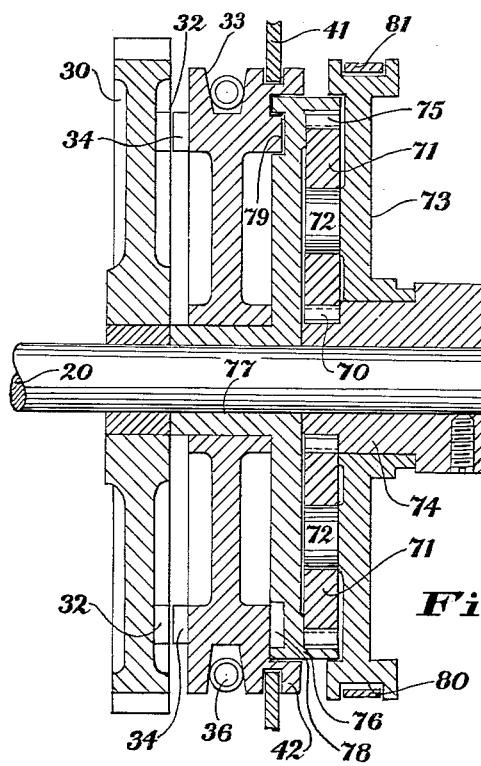
Figure 3:
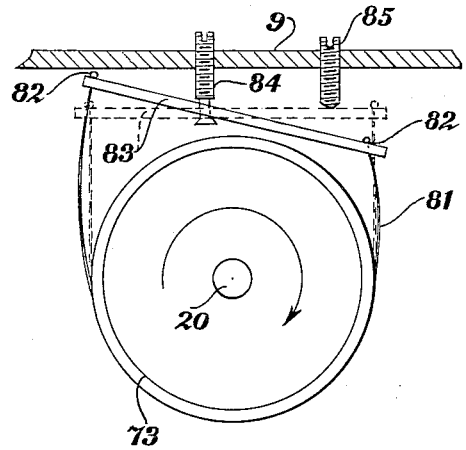
Figure 4:
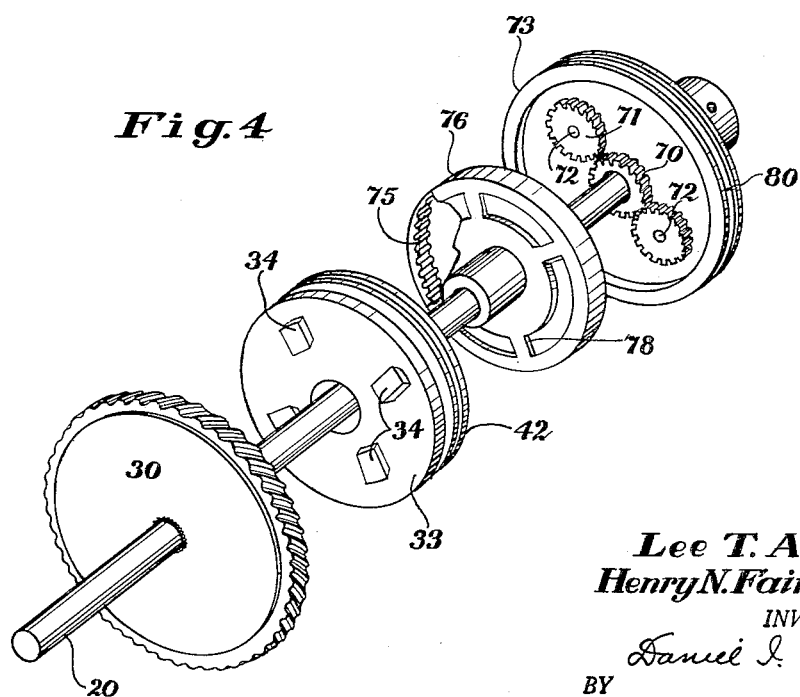

The novel features that we consider characteristic of our invention are set forth with particularity in the appended claims. The invention itself, however, both as to its organization and its methods of operation, together with additional objects and advantages thereof, will best be understood from the following description of specific embodiments when read in connection with the accompanying drawing in which, Fig. 1 is a side elevational view, partly in section, of the driving mechanism of a motion-picture projector incorporating a drive for the supply spindle constructed in accordance with a preferred embodiment of the present invention, Fig. 2 is an enlarged sectional view taken substantially on line 2—2 of Fig. 1 and showing the supply spindle drive with the drive pulley shifted to the position it assumes on the drive shaft for either reverse or forward projection operation, Fig. 3 is a diagrammatic view showing the operation of the one-way brake for the planet carrier, and showing in full lines the position the brake assumes under forward projection operating conditions and showing in dotted lines the position the brake assumes under reverse projection operating conditions, and Fig. 4 is an exploded perspective view of the parts making up the drive for the supply spindle.

Referring to the drawings, the projector as a whole consists of two parts—a lamp house 10 in which an incandescent lamp, not shown, may be mounted, and a mechanism housing 11 which is mounted forwardly and to one side of the lamp house 10. As is well known, and as clearly shown in U. S. Patent 2,193,031, to which reference can be had for a complete description of a projector having a film path and drive operating on the same principle as the present projector, the film is fed from a supply reel through a gate and past an objective by an intermittent pull-down mechanism to which film is fed by a sprocket mounted on drive or sprocket shaft 20 and from which the film is pulled by a sprocket mounted on sprocket shaft 20' and fed to a take-up reel. Since all of these film feeding and guiding elements are conventional and are shown in the above-noted patent to which reference can be had for a further description thereof, only the sprocket shafts 20 and 20' have been shown herein since it is only shaft 20 which has any significance to the present invention.

Fixed to and extending from the mechanism housing 11 is a pair of reel arms 15 and 16, the reel arm 15 extending upwardly from the housing and having a supply spindle 17 rotatably mounted on the end thereof for supporting a supply reel of film, and the reel arm 16 extending below the housing 11 and having a take-up spindle 18 rotatably mounted on the end thereof for supporting a take-up reel. The operating mechanism for the projector includes the shaft 23 which is journalled at both ends in gear housings 24 and 25 fixed to the end walls of the mechanism housing, said shaft being driven from a reversible motor, not shown, through the belt 26 engaging the pulley 26' fixed to the end of the shaft. A second shaft 28 journalled in the gear housings 24 and 25 is driven from the shaft 23 through the medium of gears, not shown, but which are enclosed in the gear housings 24 and 25; and fixed to shaft 28 is a worm 29. Worm-wheels 30 and 31 fixed to the drive or sprocket shafts 20 and 20' are in constant engagement with the worm and each has a clutch member or members fixed to the outside face thereof. In the preferred embodiment of the present invention where all of the gears are molded from a suitable plastic material, i. e. nylon, these clutch members take the form of ratchet teeth 32 spaced circumferentially of, and extending laterally from, the web of the worm wheels, see Fig. 2. Since the shiftable clutch connection between pulley 33' and worm wheel 31 is the same as that between pulley 33 and worm wheel 30, Fig. 2 will clearly illustrate the respective drives for pulleys 33 and 33' up to this point. Pulley 33 is connected to the pulley 35 fixed to the end of supply spindle 17 by a coil spring belt 36, and pulley 33' is connected to the pulley 37 fixed to the take-up spindle 18 by the coil spring belt 38, see Fig. 1.

For purposes of forward projection, it is necessary to have the sprockets driven, the take-up spindle driven, and the supply spindle idle. On the other hand, for rewinding purposes, it is necessary to have the supply spindle driven and the take-up spindle running idle, the drive for the sprockets being of no consequence since rewinding is effected by running the film directly from reel to reel outside of the projector proper. In order to effect this change in drive for the reel spindles automatically through the actuation of a single lever, a shifting mechanism of the type shown fully in U. S. Patent 2,193,031 may be used. Only the bare essentials of this shifting mechanism are shown in Fig. 1 since the structure thereof is not a critical part of the present invention. An L-shaped rewind shift lever 38 is slidably mounted on the rear wall of the mechanism housing 11 by having slots in one arm thereof engaging studs 40 projecting from the rear wall. The other arm of the rewind shift lever is forked, as shown at 41, to engage a grooved collar 42 fixed to the rewind pulley 33 so that a movement of the shift lever will move the clutch elements 34 on the rewind pulley into and out of engagement with the clutch elements 32 on the worm wheel 30. An L-shaped take-up shift lever 43, indentical with rewind shift lever 38, is slidably mounted on the rear wall 9 by having slots therein engaging studs 45 extending from said wall. This take-up shift lever has a forked end 46 which engages a grooved collar 47 fixed to the pulley 33' so that a movement of the shift lever will move the clutch members on the take-up pulley into and out of engagement with clutch members on the worm wheel 31. In order to satisfy forward projection requirements, it is necessary to disconnect the rewind pulley 33 from its associated worm wheel 30 and connect the take-up pulley 33' to its worm wheel 31, while for rewind purposes the reverse is true. This means that the rewind and take-up pulleys must be simultaneously moved in opposite directions on their shafts. To this end, a connecting lever 48 is pivoted intermediate its ends on a screw 49 and has one end 50 forked to engage a pin 51 fixed to the rewind shift lever and the other end 52 forked to engage a pin 53 fixed to the take-up shift lever 43 so that a movement of the rewind shift lever in one direction to effect a driving connection between the rewind pulley 33 and the worm wheel 30 will cause the take-up shift lever to move the take-up pulley 31 out of driving engagement with the worm wheel 31 and vice versa. This shifting of the rewind shift lever is effected by pulling or pushing on an actuating member 54 which extends from the mechanism housing and moves into and out of the film path of the projector.

Up to this point, the described projector driving mechanism is essentially the same as that shown in U. S. Patent 2,193,031 and is suitable only for projectors which are capable of forward projection. The present invention consists in modifying this driving mechanism so as to permit reverse projection as well as forward projection and to provide the necessary reduced speed of the supply spindle for such operation and the desired relationship of driving torques applied to the supply spindle as required for high speed rewind and for low speed reverse operation when using film reels of varying sizes. The modification of the projector drive necessary to produce these desired results is confined solely to the drive for the supply spindle with the exception that the projector motor, not shown, should be a reversible one, or the drive between the motor and drive shaft 20 should include a reversing mechanism, so that reverse projection can be accommodated.

Coming now to the present invention, and referring particularly to Figs. 2, 3 and 4, the drive for the supply spindle 17 comprises the drive or sprocket shaft 20 which is driven by the worm wheel 30 fixed thereto. As explained above, this worm wheel is driven by worm 29 and is driven in one direction for rewind and forward projection and is driven in the reverse direction for reverse operation. Slidably and rotatably mounted on shaft 20 is the rewind pulley 33 engaged by belt 36 which can be shifted axially of the shaft by means of yoke 41 of the rewind shift lever which engages the grooved collar 42 on the pulley. As explained above, the worm wheel 30 and the face of the pulley 33 adjacent thereto have cooperating clutch members 32 and 34 thereon, respectively, which can be moved into engagement for rewind purposes when pulley 33 is shifted toward the worm wheel. Under such a condition, the rewind pulley will be directly connected to the worm wheel to be driven at high speed and with a high torque, both of these conditions being necessary or desirable for rewind purposes.

Mounted on the shaft 20 to the right of pulley 33, looking at Fig. 2, is an epicyclic system in the form of a planetary gearing including a sun gear 70 fixed to shaft 20 by a set screw to be driven thereby. This sun gear is engaged by a pair of planet gears 71 rotatably carried by studs 72 extending from the face of a planet carrier 73 which takes the form of a disc rotatably mounted on a shoulder 74 of the sun gear. The planet gears 71 are engaged by the teeth 75 of an internal gear 76 having a hub 77 which rotatably engages the shaft 20 and engages the hub of worm wheel 30 to axially space the internal gear from the worm wheel. This hub 77 also constitutes the bearing surface on which rewind pulley 33 is rotatably and slidably mounted. The face of the internal gear adjacent pulley 33 is provided with clutch members in the form of four lugs 78 extending axially therefrom and circumferentially spaced by 90° from one another. The face of the pulley 33 adjacent internal gear 76 is also provided with clutch members in the form of four lugs 79 which are adapted to cooperate with the clutch members on gear 76 when the pulley is slid to the right and hence positively connect the internal gear 76 to the pulley 33. This is the position of the pulley 33 for reverse and forward projections and the pulley is disconnected from the worm wheel 30, see Fig. 2.

When the projector is operating under forward projection conditions, the supply spindle 17 should not be driven but should be allowed to idle whereby the film can be pulled freely from the supply reel by the film feeding mechanism. This condition will be met even though the pulley 33 is clutched to the internal gear 76 as shown in Fig. 2, providing the planet carrier 73 is left free to rotate because then the planet gears 71 will rotate around the internal gear 76 without driving it. When the projector is to be operated for reverse projection, the supply spindle must be rotated in the same direction as for rewind but at a greatly reduced speed and with a lighter driving torque which should be adjustable to accommodate film reels of different sizes. According to the invention, this is done by reversing the direction of drive of shaft 20 and braking the planet carrier so that the planet gears will drive the internal gear 76 and hence the pulley 33 clutched thereto at the desired reduced speed.

To this end, we provide a brake for the planet carrier which is automatic in that it is one-way and responds to the direction of rotation of shaft 20 and is so constructed that its braking effect can be adjusted to provide the driving torque necessary on the supply spindle for reverse operating purposes. As shown in Figs. 1, 2 and 3, this braking mechanism comprises providing the periphery of the planet carrier 73 with a recessed brake drum surface 80 which is embraced by a brake band 81 having its free ends connected at 82 to the opposite ends of a bar 83. While this brake band may be made of any material, we have found that a steel band works very well for this purpose. The bar 83 is loosely pivoted on the end of an adjustable screw 84 which is threaded into a fixed part of the projector, in this instance the rear wall 9 of the mechanism housing 11. It will be observed that the pivot point for bar 83 is to one side of its center so as to provide arms on each side of the pivot point which are of different length. By so mounting the bar 83, a one-way brake is provided by virtue of the fact that when the bar tips to the tilted position shown in full lines in Figs. 1 and 3, the band is loosened on the drum and provides no braking action, whereas when the bar is tilted in the other direction, see dotted line position Fig. 3, the band is tightened on the drum and brakes the same. The slight normal frictional engagement between the band and drum is sufficient to tilt the bar 83 in its two directions so that when the shaft 20 is rotating in a direction for forward projection, see arrow in Fig. 3, the bar is automatically tilted to free the band from the drum and permits the mechanism to idle. On the other hand, if the shaft 20 is reversed, as it would be for reverse projection, the bar will be tilted in the other direction and as the band is effectively shortened the frictional braking action will be increased until the brake completely stops the drum and planet carrier 73. When the planet carrier is braked, the planet gears 71 drive the rewind pulley 33 through the planet gears at a reduced speed which is not desired during rewind. In order to adjustably limit the torque which is applied to rewind pulley through the planetary system, an adjusting screw 85 is provided to limit the amount the bar 83 can tilt in the brake applying direction. By adjusting the screw 84, the effective length of the brake band can be adjusted to give the desired freedom to the brake in the off position but still leave sufficient friction between the band and drum so that the brake will be automatically applied when the shaft 20 is rotated in the reverse direction. This adjustment will also allow for taking up for any stretch the band might suffer during use providing, of course, the band used is made of a stretchable material.

From the above description, it will be readily understood that we have provided a projector drive mechanism which provides for projection in both forward and reverse directions and rewind at high speeds by simply modifying the drive for the supply spindle of the projector in a way which is compact and readily adapted to conventional projector mechanisms. Furthermore, this added feature of reverse projection has been added in such a way that the normal operation of conventional projectors has been changed only to the extent that the operator is required only to reverse the direction of drive of the projector to obtain these added operations, the rewind procedure being exactly the same from the operator's standpoint as in conventional machines to which he is accustomed. In order to briefly summarize the operation of the present invention, for both forward and reverse projection the rewind pulley 33 is shifted to the position shown in Fig. 2 where it is clutched to the planetary system. Now if the drive shaft 20 is being rotated in the forward direction, see arrow in Fig. 3, the brake band 81 is free and permits the rewind pulley 33 to idle. For reverse projection, the shaft 20 is reversed, either by reversing the drive motor or operating a reverse gearing in the drive to the shaft, and this causes the brake band 81 to grip the planet carrier 73, whereupon the torque will be increased until the torque adjusting screw 85 is contacted to limit the torque. This puts the planet gears 71 and internal gear 76 in driving relation to provide a reduced speed drive for the rewind pulley 33 which is not desired during rewind. Rewinding is done with the shaft 20 rotating in the forward direction by shifting the rewind pulley 33 to the left in Fig. 2 and clutching it directly to the worm wheel 30. While we have shown a one-way brake for the planetary system which is automatic in operation, it goes without saying that manually operated brakes of different forms could be used without going beyond the scope of the invention although they might require one more operation on the part of the operator.

Although we have shown and described certain specific embodiments of our invention, we are fully aware that many modifications thereof are possible. Our invention, therefore, is not to be restricted to the precise details of construction shown and described but is intended to cover all modifications coming within the scope of the appended claims.

Having thus described our invention, what we claim as new and desire to secure by Letters Patent of the United States is:

1. In a motion-picture projector the combination with a rotatable supply spindle for receiving a supply reel of film, of means for selectively driving said spindle in one direction at different speeds and at differen torques for reverse and rewind purposes and freeing the spindle for rotation in the other direction for forward projection and comprising a drive shaft, means for selectively driving said shaft in one direction for rewind and forward projection and in the other direction for reverse projection, a planetary gearing coaxial with said drive shaft and including a sun gear fixed to said shaft, a planet carrier coaxial with and rotatable relative to said shaft, a planet gear rotatably mounted on said carrier and engaging said sun gear, an internal gear rotatably mounted on said shaft and engaging said planet gear, a pulley rotatably and slidably mounted on said shaft, a belt connecting said pulley with said rewind spindle, means for selectively sliding said pulley between a rewind position and a reverse position, means for clutching said pulley to said shaft when it is moved to its rewind position, means for clutching said pulley to said internal gear when it is moved to its reverse position, and means for selectively braking said planet carrier when the shaft is rotating in the direction for reverse operation so that the planet gears drive the pulley at reduced speed and for freeing said planet carrier when said shaft is rotating in the opposite direction for forward projection so that the planetary gearing idles and does not drive the pulley.

2. Means for selectively driving the supply reel spindle of a motion-picture projector according to claim 1 in which said means for selectively braking said planet carrier is automatic in operation and responds to the direction of rotation of said shaft.

3. Means for selectively driving the supply reel spindle of a motion-picture projector according to claim 1, characterized by the fact that means are provided for adjusting the amount of braking action applied to said planet carrier when the brake is applied so as to limit the driving torque applied to said supply spindle during reverse operation.

4. Means for selectively driving the supply reel spindle of a motion-picture projector according to claim 1, in which said means for selectively braking said planet carrier is automatic in operation and comprises a brake member movably mounted on said projector to normally frictionally engage said planet carrier and have its frictional engagement therewith increased when said shaft is rotating in the direction for reverse projection, and adjustable means for limiting the movement of said brake member in a braking direction whereby the driving torque applied to said supply spindle during reverse operation can be limited.

5. In a motion-picture projector including a rotatable supply spindle for receiving a supply reel of film, means for selectively driving said spindle in one direction at slow speed and with a limited torque for reverse projection and in the same direction at high speed and with a greater torque for rewind purposes and allowing the spindle to rotate free of said drive in the opposite direction for forward projection and comprising a drive shaft, means for selectively driving said shaft in one direction for rewind and forward projection and in the other direction for reverse projection, and including a drive member fixed to said shaft, a planetary gearing coaxial with said drive shaft in spaced relation to said drive member and including a sun gear fixed to said shaft, a circular planet carrier coaxial with and rotatable relative to said shaft, planet gears rotatably mounted on said carrier and engaging said sun gear, an internal gear rotatably mounted on said shaft and engaging said planet gears, a pulley rotatably and slidably mounted on said drive shaft between said drive member and said planetary gearing, cooperating clutch elements on the opposite faces of said pulley and the faces of said drive member and internal gear adjacent said pulley, means for selectively sliding said pulley between a rewind position wherein it is clutched to said drive member and a reverse and forward projection position wherein it is clutched to said internal gear, and means for selectively braking said planet carrier when the shaft is rotating in the direction for reverse operation so that the planet gears drive the pulley at reduced speed and with limited torque and for freeing said planet carrier when said shaft is rotating in the opposite direction for forward projection so that the planetary gearing idles and does not drive the pulley, said last-mentioned means including a brake band embracing a portion of the periphery of said planet carrier, and means for selectively tightening the brake band to retard said carrier when the shaft is rotating in a direction for reverse projection and for loosening the brake band to free said carrier when said shaft is rotating in the other direction.

6. In a motion-picture projector including a rotatable supply spindle for receiving a supply reel of film, means for selectively driving said spindle in one direction at slow speed and with a limited torque for reverse projection and in the same direction at high speed and with a greater torque for rewind purposes and allowing the spindle to rotate free of said drive in the opposite direction for forward projection and comprising a drive shaft, means for selectively driving said shaft in one direction for rewind and forward projection and in the other direction for reverse projection, and including a drive member fixed to said shaft, a planetary gearing coaxial with said drive shaft in spaced relation to said drive member and including a sun gear fixed to said shaft, a circular planet carrier coaxial with and rotatable relative to said shaft, planet gears rotatably mounted on said carrier and engaging said sun gear, an internal gear rotatably mounted on said shaft and engaging said planet gears, a pulley rotatably and slidably mounted on said shaft between said drive member and said planetary gearing, cooperating clutch elements on the opposite faces of said pulley and the faces of said drive member and internal gear adjacent said pulley, means for selectively sliding said pulley between a rewind position wherein it is clutched to said drive member and a reverse and forward projection position wherein it is clutched to said internal gear, and means for selectively braking said planet carrier when the shaft is rotating in the direction for reverse operation so that the planet gears drive the pulley at reduced speed and with limited torque and for freeing said planet carrier when said shaft is rotating in the opposite direction for forward projection so that the planetary gearing idles and does not drive the pulley, said last-mentioned means including a brake band embracing a portion of the periphery of said planet carrier, and a one-way brake acting on said planet carrier to apply a braking effect thereto only when said shaft is rotating in the direction for reverse projection.

7. Means for selectively driving the supply reel spindle of a motion-picture projector according to claim 5 characterized by the fact that said brake band embraces approximately 180° of the periphery of the planet carrier, a bar connected to the free ends of said band to hold them in spaced relation, means for pivotally mounting said bar to one side of its center to provide arms of different length connecting the two ends of the brake band whereby frictional drag between the band and said carrier causes said bar to pivot in one direction when said shaft is rotating in the direction for forward projection and loosen the band from the carrier and causes said bar to pivot in the other direction to tighten said band on the carrier when the shaft is rotated in the direction for reverse operation.

8. Means for selectively driving the supply reel spindle of a motion-picture projector according to claim 5 characterized by the fact that said brake band embraces approximately 180° of the periphery of the planet carrier, a bar connected to the free ends of said band to hold them in spaced relation, means for pivotally mounting said bar to one side of its center to provide arms of different length connecting the two ends of the brake band whereby frictional drag between the band and said carrier causes said bar to pivot in one direction when said shaft is rotating in the direction for forward projection and loosen the band from the carrier and causes said bar to pivot in the other direction to tighten said band on the carrier when the shaft is rotated in the direction for reverse operation, and adjustable means for limiting the pivotal movement of said bar in the band tightening direction for controlling the amount of driving torque applied to said spindle during reverse projection.

References Cited in the file of this patent

UNITED STATES PATENTS

| | | |
|---|---|---|
| 765,346 | Smith | July 19, 1904 |
| 1,649,050 | Winch | Nov. 15, 1927 |
| 1,706,888 | Krauss | Mar. 26, 1929 |
| 1,978,416 | Dodge | Oct. 30, 1934 |
| 2,107,540 | Lichtenberg | Feb. 8, 1938 |
| 2,193,031 | Lyman et al. | Mar. 12, 1940 |
| 2,467,627 | Olson | Apr. 19, 1949 |
| 2,604,271 | Moomaw | July 22, 1952 |